United States Patent
Dubay

(10) Patent No.: US 7,134,637 B2
(45) Date of Patent: Nov. 14, 2006

(54) VACUUM AND VENT BLOCK FOR USE WITH MOLDING AND CASTING SYSTEMS

(76) Inventor: Richard L. Dubay, 11748 Crocus St., Coon Rapids, MN (US) 55733

( * ) Notice: Subject to any disclaimer, the term of this patent is extended or adjusted under 35 U.S.C. 154(b) by 308 days.

(21) Appl. No.: 10/672,090

(22) Filed: Sep. 26, 2003

(65) Prior Publication Data

US 2004/0109909 A1    Jun. 10, 2004

Related U.S. Application Data

(60) Provisional application No. 60/414,019, filed on Sep. 27, 2002.

(51) Int. Cl.
  *B29C 33/46* (2006.01)
(52) U.S. Cl. ............... 249/141; 164/305; 164/410; 425/812; 425/420; 425/192 R; 425/182; 425/195; 249/135
(58) Field of Classification Search ............... 164/305, 164/410; 425/812, 420, 192 R, 182, 195; 249/141, 135
  See application file for complete search history.

(56) References Cited

U.S. PATENT DOCUMENTS

| | | | |
|---|---|---|---|
| 3,892,508 A | | 7/1975 | Hodler |
| 4,027,726 A | * | 6/1977 | Hodler ............... 164/305 |
| 4,153,231 A | | 5/1979 | Hayakawa et al. |
| 4,359,443 A | | 11/1982 | Michaels |
| 4,828,479 A | * | 5/1989 | Pleasant ............... 425/192 R |
| 5,012,568 A | * | 5/1991 | DiSimone et al. ....... 29/402.08 |
| 5,263,532 A | * | 11/1993 | Kawaguchi et al. ..... 164/155.6 |
| 5,350,289 A | * | 9/1994 | Martin ............... 425/190 |
| 5,360,049 A | * | 11/1994 | Rowe ............... 164/16 |
| 5,562,150 A | * | 10/1996 | Shimmell ............... 164/305 |
| 5,913,355 A | | 6/1999 | Muramatsu |
| 5,913,356 A | * | 6/1999 | Muramatsu ............... 164/305 |
| 6,634,411 B1 | * | 10/2003 | Hirano et al. ............... 164/72 |
| 2002/0100860 A1 | | 8/2002 | Wieder |
| 2002/0127292 A1 | | 9/2002 | Gallinotti et al. |

OTHER PUBLICATIONS

Web site www.ngkmetals.com/chillcust.html, printed Jan. 16, 2004.
Web site www.ngkmetals.com/chilladvn.html, printed Jan. 16, 2004.
Web site www.ngkmetals.com/chillvent.html, printed Jan. 16, 2004.

* cited by examiner

*Primary Examiner*—Robert Davis
*Assistant Examiner*—G. Nagesh Rao
(74) *Attorney, Agent, or Firm*—Kinney & Lange, P.A.

(57) ABSTRACT

The present invention relates to a gas purging block for use with injection molding and die casting systems, which includes a stationary-side block adapted to be removably mounted to a stationary-side mold half of the injection molding or die casting system, and an ejector-side block adapted to be removably mounted to an ejector-side mold half of the injection molding or die casting system. At least one of the stationary-side block and the ejector-side block includes a pair of channels extending through the block adapted to selectively function as conduits for cooling fluid and as mounting bores for mounting the block to the respective mold half.

19 Claims, 9 Drawing Sheets

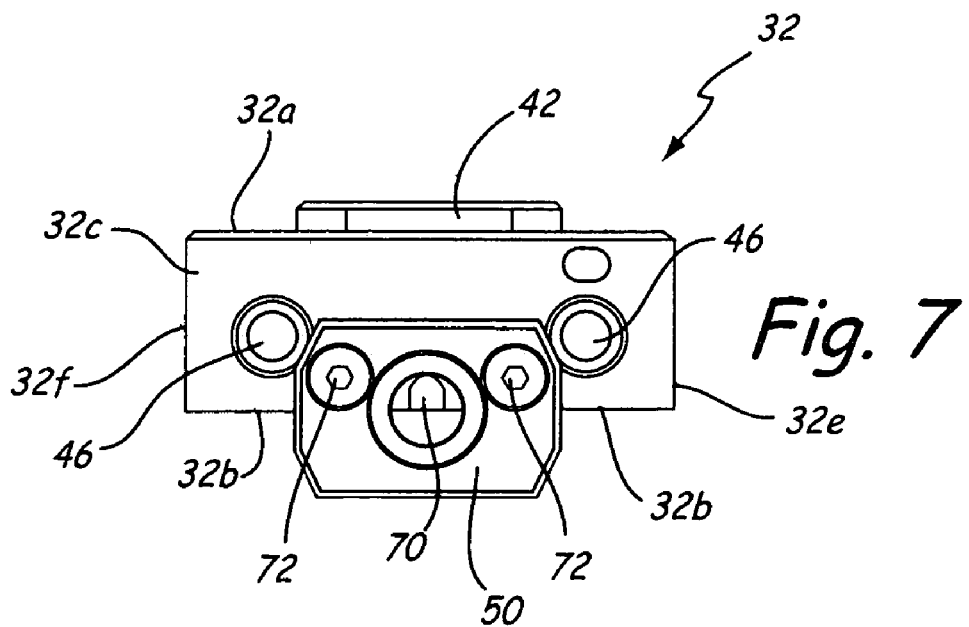
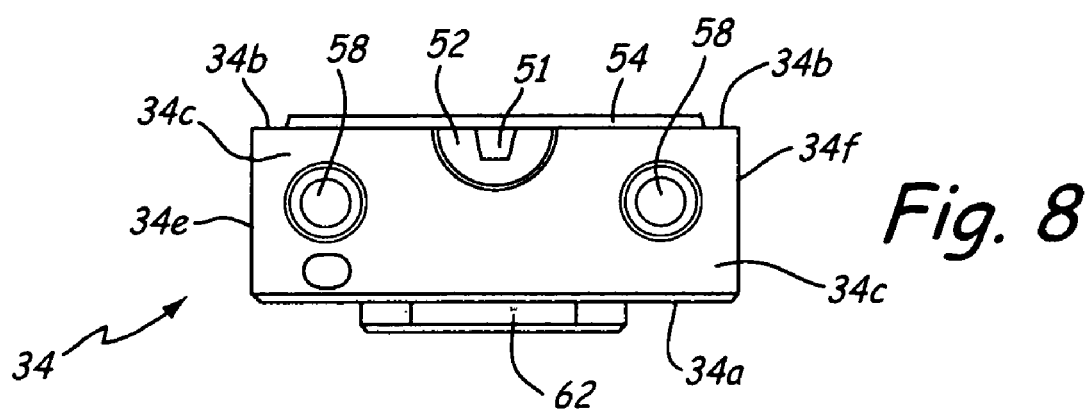

VACUUM AND VENT BLOCK FOR USE WITH MOLDING AND CASTING SYSTEMS

CROSS-REFERENCE TO RELATED APPLICATION(S)

Priority is claimed under U.S. Provisional Application No. 60/414,019, entitled Injection Mold Component, and filed Sep. 27, 2002, which is incorporated by reference.

BACKGROUND OF THE INVENTION

The present invention relates to injection molding and die casting systems. In particular, the present invention relates to vacuum blocks and vent blocks used with injection molding and die casting systems.

Injection molding and die casting processes typically incorporate stationary and ejector mold halves, which open and close to define a cavity where the molding or casting material is injected. Stationary mold halves are also known as the fixed-die halves or holder blocks, or cover blocks, and are mounted on stationary platens. In contrast, ejector mold halves, also known as the movable-die halves or holder blocks, are capable of moving relative to the stationary holder blocks for opening and closing the cavity. Ejector mold halves are mounted to ejector platens, which are generally connected to hydraulic actuators for providing the movement.

Vacuum assistance in injection molding and die casting processes has been utilized to varying degrees for optimizing product quality. The general intent of the vacuum is to improve the production of injection molding and die casting by removing gases from within the molding and casting cavities. These improvements include higher surface quality, reduced level of porosity, and greater physical characteristics. Vacuum assistance generally requires the use of a vacuum pump, a vacuum line connecting the pump to the molding or casting cavity, and a means for preventing excess injected material from flowing into the vacuum system. One approach for preventing the flow of the injected material is with an automated or manual valve located along the vacuum line. The purpose of the valve is to stop the flows of the vacuum and the excess material before the excess material enters the vacuum system.

An alternative approach for preventing the flow of the injected material is with gas purging blocks, such as a vacuum block. Vacuum blocks are typically connected to the stationary and ejector holder blocks, and simultaneously provide a path for allowing the vacuum to remove the gases, and allow the injected material to solidify during the pulling of the vacuum. The solidified material functions as a stopper, preventing further material from flowing into the vacuum system. As such, vacuum blocks preclude the need for mechanical valves.

Similarly, vent blocks allow gases to be purged from the cavity of a molding or casting system. The gases are forced out by the force of the injected material. If the injected material is not stopped, it will continue to flow out with the purged gas. The vent block also allows the injected material to solidify during the injection process, effectively stoppering the purging passageway. Typically, with both vacuum blocks and vent blocks, the excess material that is solidified in the blocks is cut from the molded products and recycled back into the raw materials for further use.

Based upon the molding or casting process required, different vacuum blocks or vent blocks may be required. For example, if a molding or casting system requires vacuum blocks with different cooling properties to produce different products, multiple vacuum blocks may be required. This can become expensive and time consuming if the molding or casting system requires individualized modifications to accommodate each vacuum block. As such, there is a need in the industry for vacuum blocks and vent blocks that are universal in nature, being versatile, efficient, and interchangeable for reducing costs and time.

BRIEF SUMMARY OF THE INVENTION

The present invention is a gas purging block for use with injection molding and die casting systems comprising a stationary-side block and an ejector-side block, which are capable of engaging to function as a vacuum or vent block. At least one of the stationary-side block and the ejector-side block contains a pair of channels extending through the block, adapted to selectively function as conduits for cooling fluid and as mounting bores for mounting the block to a respective mold half.

BRIEF DESCRIPTION OF THE DRAWINGS

FIG. 2b is a sectional view taken along line 2b—2b in FIG. 2a.

FIG. 2c is a sectional view of taken along line 2c—2c in FIG. 2a.

FIG. 7 is a top view of the stationary-side block of the present invention.

FIG. 8 is a top view of the ejector-side block of the present

DETAILED DESCRIPTION

Figure 1:
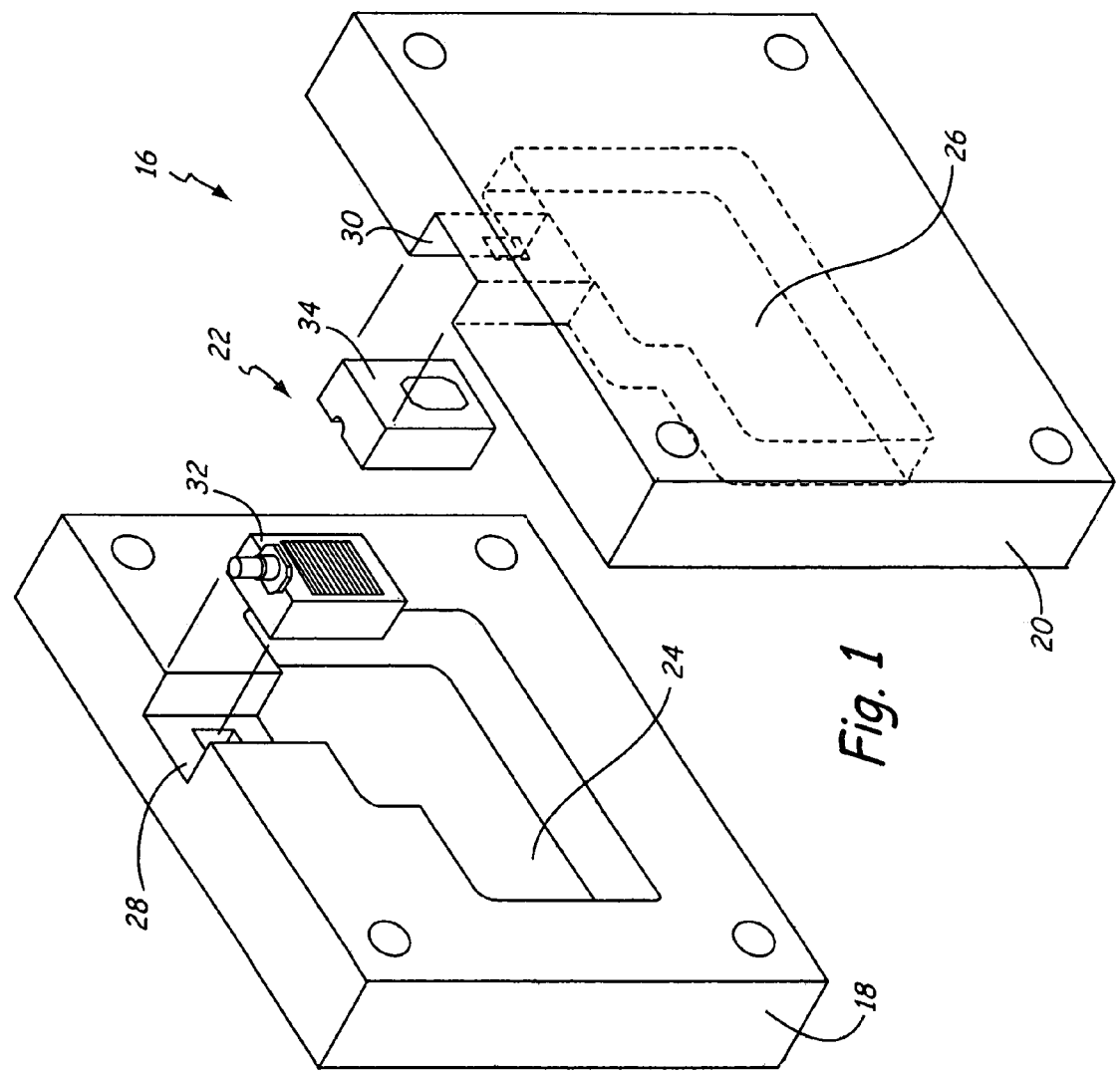
FIG. 1 is an exploded perspective view of the present invention in use.

FIG. 1 is an exploded perspective view of injection molding or die casting system 16. Injection molding or die casting system 16 includes mold halves 18 and 20 and gas purging block 22 of the present invention. Mold halves 18 and 20 respectively refer to a stationary holder block and an ejector holder block. A stationary holder block is typically a fixed-half mold or die holder block that includes a cavity portion, such as cavity 24. Similarly, an ejector holder block is typically a movable-half mold or die holder block that also includes a cavity portion, such as cavity 26, illustrated by phantom lines. Mold halves 18 and 20 also include pockets 28 and 30, which are slots machined into mold halves 18 and 20 at opposing locations, facing each other. For simplification, the additional components of a molding or casting system, such as the platens, the ejector pin, the vacuum system, and the injection mechanism, are not illustrated.

Gas purging block 22 is a versatile vacuum block system and includes stationary-side block 32 and ejector-side block 34, each containing channels capable of functioning alternatively as coolant channels or mounting bores. This allows stationary-side block 32 and ejector-side block 34 to be used with a variety of molding and casting systems.

Gas purging block 22 is mounted to mold halves 18 and 20 at pockets 28 and 30. Because pockets 28 and 30 are at opposing locations, stationary-side block 32 and ejector-side block 34 are aligned when inserted. Stationary-side block 32 may be mounted directly to mold half 18 at pocket 28 such that the base of stationary-side block 32 is flush with the wall of cavity 24. Similarly, ejector-side block 34 may be mounted directly to mold half 20 at pocket 30 such that the base of ejector-side block 34 is flush with the wall of cavity 26. In such case, the channels contained in stationary-side block 32 and ejector-side block 34 may function as coolant channels.

Alternatively, gas purging block 22 may be secured to mold halves 18 and 20 by inserting stationary-side block 32 and ejector-side block 34 into pockets 28 and 30, and mounting stationary-side block 32 and ejector-side block 34 to cavity inserts (not shown). Cavity inserts are frames supported within cavities 24 and 26, as is known in the art, for enhancing the shapes and designs of the molds or die casts. In such case, the channels contained in stationary-side block 32 and ejector-side block 34 function as mounting bores for securing stationary-side block 32 and ejector-side block 34 to the cavity inserts.

Through the use of the channels contained in stationary-side block 32 and ejector-side block 34, gas purging block 22 is capable of being mounted to mold halves 18 and 20 in different manners, providing a versatile system for use with molding and casting systems.

When a molding or casting process begins, mold halves 18 and 20 converge together, creating a complete cavity from cavities 24 and 26. This also allows stationary-side block 32 and ejector-side block 34 to close together to function as a vacuum block. A vacuum is pulled through gas purging block 22, purging the cavities 24 and 26 of gases. When the molding or casting material is injected into the complete cavity, excess material flows into gas purging block 22. Gas purging block 22, however, allows the excess material to solidify, plugging up the vacuum line, for preventing the excess material from entering the vacuum system. To enhance the heat exchanging capabilities, gas purging block 22 is preferably cast from premium H-13 heat-treated steel or beryllium free material.

While gas purging block 22 is described herein as a vacuum block, the present invention is also intended to encompass vent blocks. In lieu of pulling a vacuum, the gases are purged from cavities 24 and 26 by the flow of the injected material. Functioning as a vent block, gas purging block 22 allows the excess material to solidify, plugging up the vent line, for preventing the excess material from spraying out of injection molding or die casting system 16.

Figure 2B:
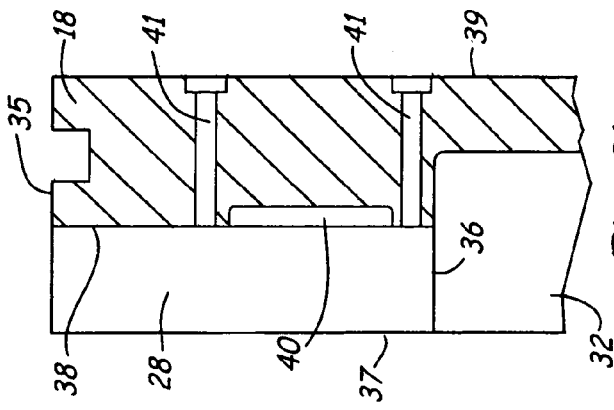
Figure 2A:
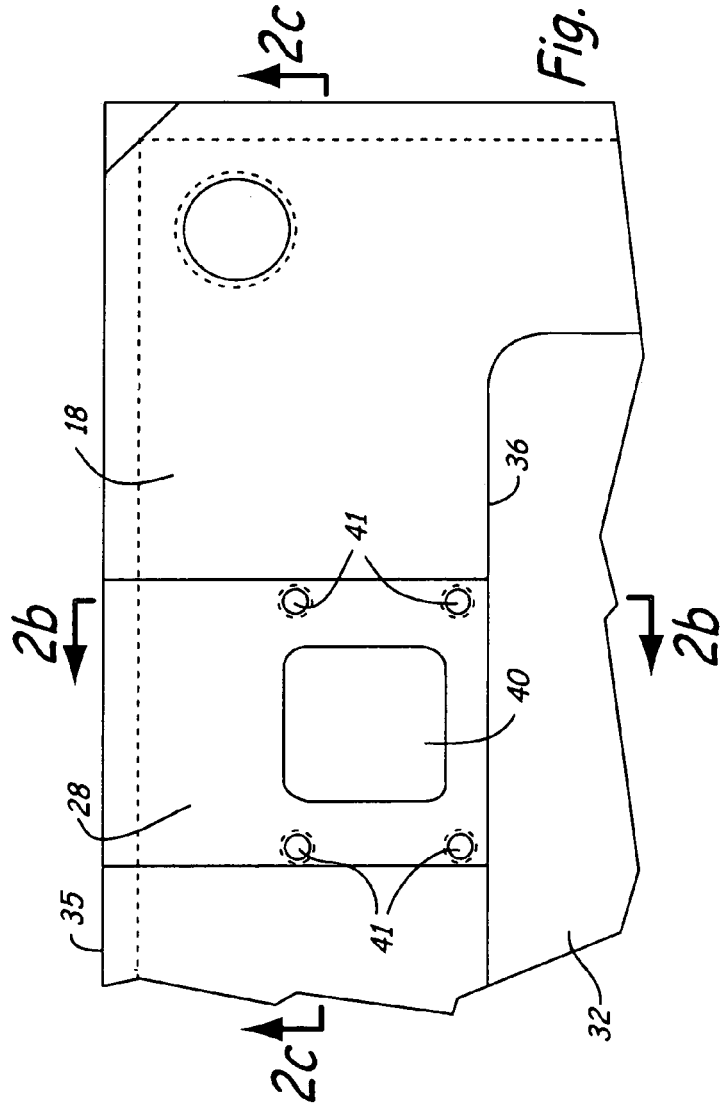
FIG. 2a is an enlarged view of a mold half and a pocket in the mold half.
Figure 2C:
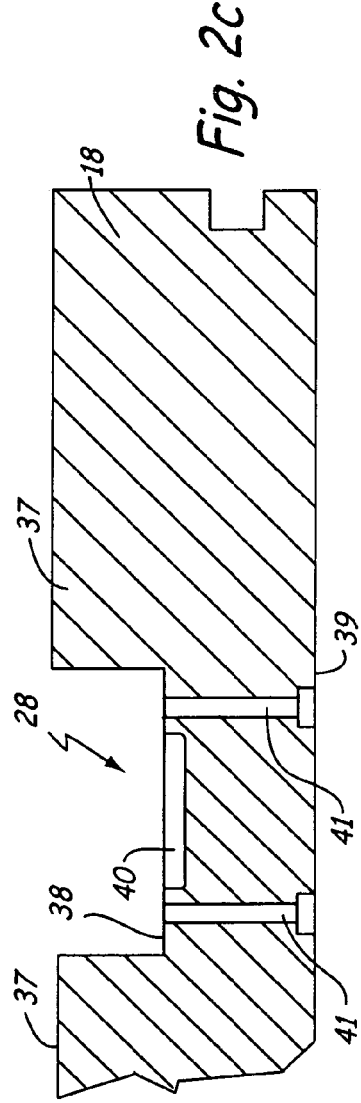

FIGS. 2a, 2b, and 2c are an enlarged view of mold half 18, a sectional view taken along line 2b—2b in FIG. 2a, and a sectional view of taken along line 2c—2c in FIG. 2a, which elaborate on the design on pocket 28. As illustrated, mold half 18 includes top surface 35, cavity surface 36, inner surface 37, pocket surface 38, outer surface 39, key slot 40, and mounting bores 41. Pocket 28 is machined into mold half 18 from top surface 35 to cavity surface 36, with a depth extending from inner surface 37 to pocket surface 38. The dimensions of pocket 28 allow stationary-side block 32 to be flush with both cavity surface 36 and inner surface 37, when inserted into pocket 28.

Pocket 28 further adjoins with key slot 40 and mounting bores 41. Key slot 40 is a groove machined into mold half 18 at pocket surface 38, and assists in aligning stationary-side block 32 when stationary-side block 32 is inserted into pocket 28. Mounting bores 41 are holes machined into mold half 18 and provide a means for directly mounting stationary-side block 32 to stationary mold half 18 at pocket surface 38 via fasteners. Mounting bores 41 extend through mold half 18 from pocket surface 38 to outer surface 39, where they are counterbored. The use of key slot 40 and mounting bores 41 allows stationary-side block 32 to be installed with minimal time and effort.

While only describing the design of pocket 28 within mold half 18, the above-discussion also applies equally to the design of pocket 30 within mold half 20. Pockets 28 and 30 are machined in an identical manner within mold halves 18 and 20, respectively, such that pockets 28 and 30 face each other.

Figure 3:
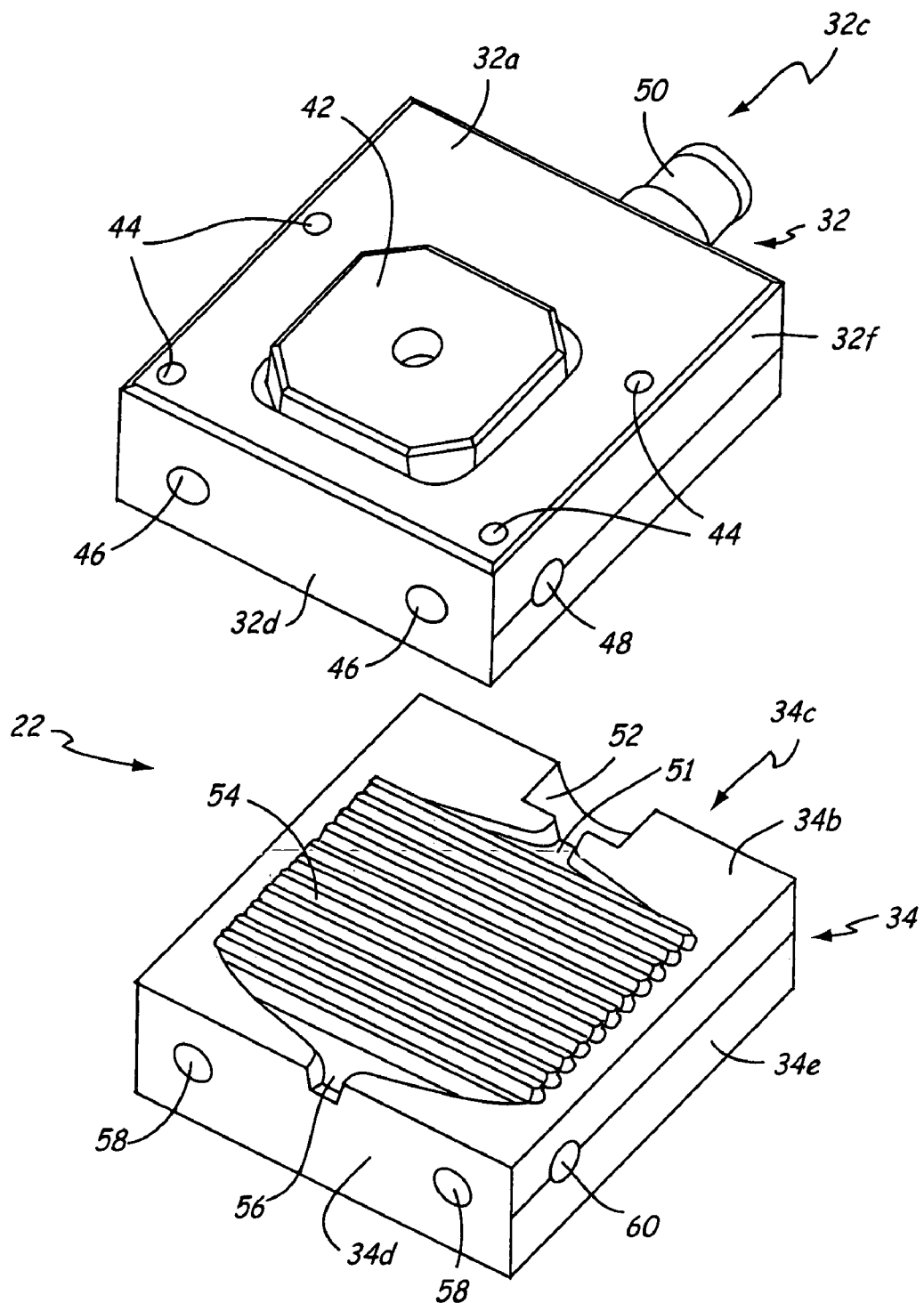
FIG. 3 is a perspective view of the present invention.
Figure 4:
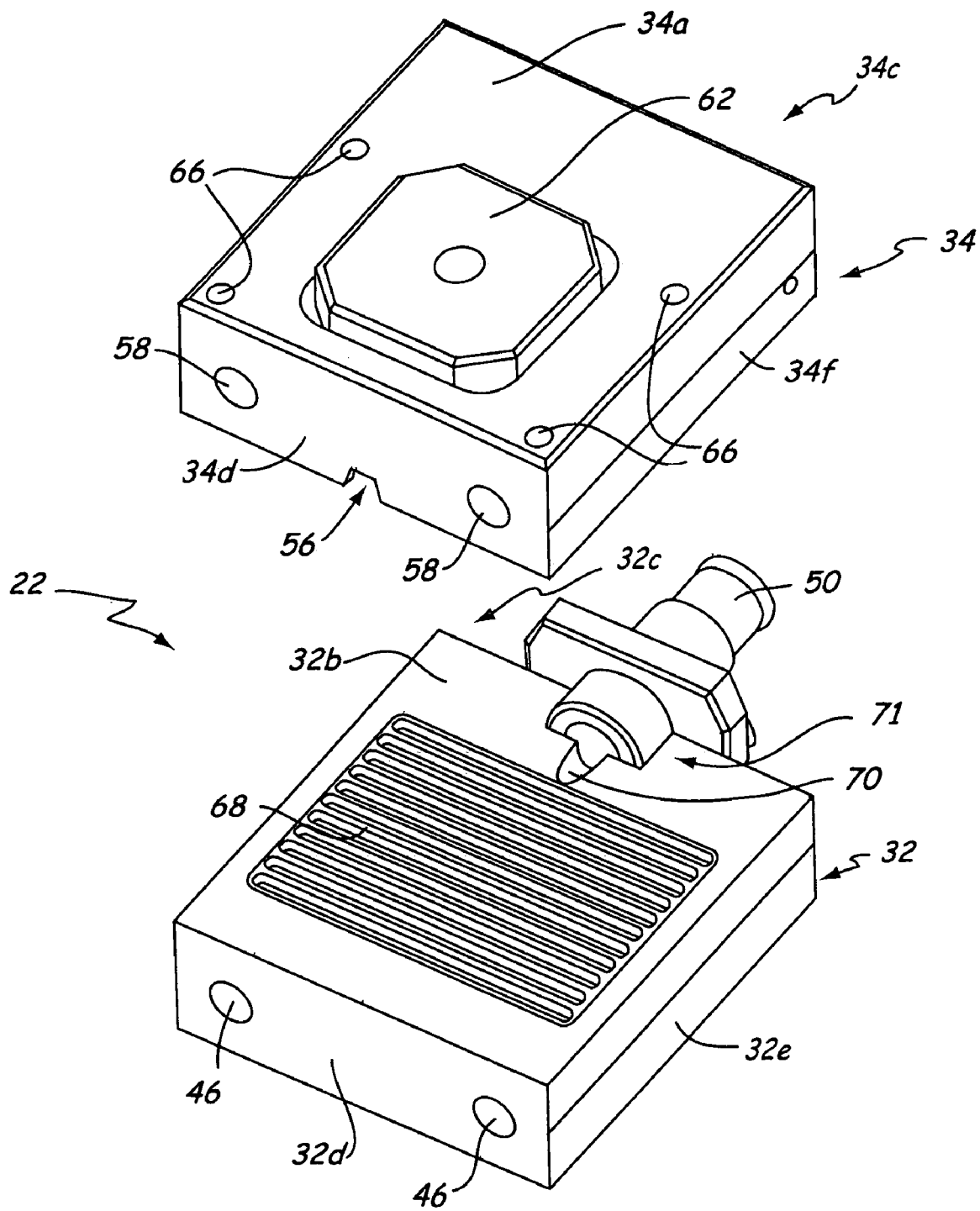
FIG. 4 is a second perspective view of the present invention, inverted from FIG. 3.

FIGS. 3 and 4 are opposing perspective views of gas purging block 22, elaborating on stationary-side block 32 and ejector-side block 34. FIG. 3 is a perspective view of gas purging block 22 with stationary-side block 32 disposed above ejector-side block 34. Correspondingly, FIG. 4 is a perspective view of gas purging block 22, where ejector-side block 34 is disposed above stationary-side block 32.

Referring to FIG. 3, stationary-side block 32 includes outer surface 32a, inner surface 32b (shown in FIG. 4), top surface 32c (not shown), bottom surface 32d, left surface 32e (shown in FIG. 4), and right surface 32f. The directional designations are used for clarification of discussion. Stationary-side block 32 also includes key 42, bores 44, channels 46, cross channel 48, and vacuum line coupling 50.

When stationary-side block 32 is inserted into pocket 28, outer surface 32a is the portion of stationary-side block 32 that is disposed along pocket surface 38. Outer surface 32a includes key 42 and bores 44, which are used for aligning and mounting stationary-side block 32 within pocket 28. Vacuum line coupling 50 is connected to top surface 32c of stationary-side block 32 and provides a connection point for a vacuum system (not shown).

Bottom surface 32d includes channels 46, which are parallel bores extending through stationary-side block 32, and out of top surface 32c. Channels 46 are the channels contained within stationary-side block 32, as discussed in FIG. 1, and serve a combination of functions for stationary-side block 32. First, channels 46 may function as a means for mounting stationary-side block 32 to a cavity insert. Fasteners are inserted through channels 46 from top surface 32c, and out from bottom surface 32d for insertion into the cavity insert. This provides an alternative means for securing stationary-side block 32 to mold half 18, such as if mold half 18 does not incorporate mounting bores 41.

Alternatively, channels 46 may function as coolant channels for allowing coolant fluids to flow through stationary-side block 32 to increase the rate of heat exchange for solidifying the excess material. Right surface 32f includes cross channel 48, which extends through stationary-side block 32, and out of right surface 32f, and assists in the flow patterns of the coolant fluids.

Ejector-side block 34 is similar to stationary-side block 32, and includes outer surface 34a (shown in FIG. 4), inner surface 34b, top surface 34c (not shown), bottom surface 34d, left surface 34e, and right surface 34f (shown in FIG. 4). Again, the directional designations are used for clarification of discussion only. Ejector-side block 34 also includes exit slot 51, coupling slot 52, ribs 54, entry slot 56, channels 58, and cross channel 60.

Coupling slot 52, ribs 54, and entry slot 56 are disposed at inner surface 34b of ejector-side block 34. Inner surfaces 32b and 34b are the portions of stationary-side block 32 and ejector-side block 34 that engage when stationary-side block 32 and ejector-side block 34 close together.

Entry slot 56 is a slot extending through bottom surface 34d, adjoining ribs 54, and is the portion where excess material flows from cavities 24 and 26 into gas purging block 22. Ribs 54 are a plurality of elongated members extending axially between right and left surfaces 34e and 34f, and increase the contact surface area for cooling the excess material Ribs 54 end in exit slot 51, which interconnects ribs 54 and coupling slot 52, for purging gases. Coupling slot 52 is the portion of ejector-side block 34 that vacuum line coupling 50 fits into when stationary-side block 32 and ejector-side block 34 are closed together, for pulling a vacuum.

Bottom surface 34d includes channels 58, which are which are parallel bores extending through ejector-side block 34, and out of top surface 34c. As with channels 46 of stationary-side block 32, channels 58 function as both a means for mounting ejector-side block 34 to a cavity insert located in cavity 26 of mold half 20, and as coolant channels. As a means for mounting stationary-side block 32 to a cavity insert, fasteners are inserted through channels 58 from top surface 34c, and out from bottom surface 34d for insertion into the cavity insert. This provides an alternative means for securing ejector-side block 34 to mold half 20, such as if mold half 20 does not incorporate mounting bores 41.

Alternatively, as coolant channels, channels 58 allow coolant fluids to flow through ejector-side block 34 to increase the rate of heat exchange for solidifying the excess material. Ejector-side block 34 also includes cross channel 48, which extends through ejector-side block 34, and out of left surface 34e, and assists in the flow patterns of the coolant fluids.

While the dimensions of gas purging block 22 are illustrated as being generally square, the present invention is not intended to be limited as such. Gas purging block 22 may include stationary-side and ejector side blocks of different dimensions as required. Factors determining the dimensions of gas purging block 22 include the size of mold halves 18 and 20, the placement of gas purging block 22 within mold halves 18 and 20, the dimensions of pockets 28 and 30, and the heat exchange requirements of gas purging block 22.

Referring to FIG. 4, stationary-side block 32 further includes ribs 68, exit slot 70, and coupling slot 71. Ribs 68 are similar to ribs 54 of ejector-side block 34 and engage with ribs 54 when stationary-side block 32 and ejector-side block 34 close together to increase the contact surface area for cooling the excess material. Exit slot 70 is a slot in stationary-side block 32 that provides a flow path from ribs 69 to vacuum line coupling 50, for allowing gases to be purged. Coupling slot 71 is the portion of stationary-side block 32 that vacuum line coupling 50 fits into. Vacuum line coupling 50 is a removable component capable of connecting to a vacuum line to pull a vacuum through gas purging block 22 when closed. Vacuum line coupling 50 is removably connected to stationary-side block 32, and may be removed to allow gas purging block 22 to function as a vent block. In such case, coupling slots 52 and 71 provide an opening to the atmosphere for venting gases.

Ejector-side block 34 further includes key 62 and bores 66, which are identical to key 42 and bores 44 of stationary-side block, for aligning and mounting ejector-side block 34 to pocket 30 of mold half 20.

Figure 5:
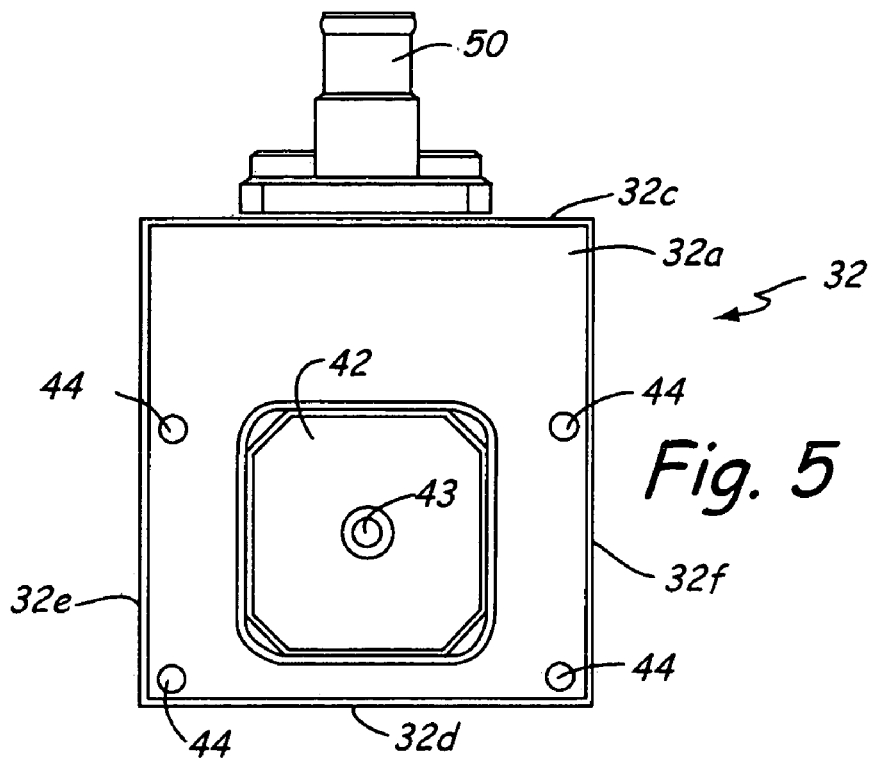
FIG. 5 is a front view of a stationary-side block of the present invention.

FIG. 5 is a front view of stationary-side block 32 of FIGS. 3 and 4, elaborating on key 42 and bores 44. Key 42 is a generally square insert for aligning stationary-side block 32 within pocket 28, and includes key bore 43. Key 42 is removably connected to stationary-side block 32 via a fastener inserted through key bore 43. When stationary-side block 32 is inserted into pocket 28 of mold half 18, key 42 inserts into key slot 40, aligning bottom surface 32d flush with cavity surface 33. The interaction between key slot 40 and key 42 allows a variety of block systems 18 to be quickly interchanged for use with various molding and casting processes without requiring excess alignment adjustments. Alternatively, by allowing key 42 to be removable, stationary-side block 32 may be used without key 42, such as if mold half 18 does not incorporate key slot 40.

Bores 44 allow stationary-side block 32 to be directly mounted to mold half 18 at pocket 28 via mounting bores 41. Fasteners are inserted through outer surface 31 of mold half 18, through mounting bores 41, and into stationary-side block 32 at bores 44. This securely mounts stationary-side block 32 to mold half 18, while also providing a convenient means for disconnecting stationary-side block 32 from mold half 18.

Additionally, bores 44 allow stationary-side block 32 to be installed externally to mold half 18, if required (e.g., if mold half 18 does not incorporate pocket 28). In such cases, stationary-side block 32 may be connected to the platen (not shown) of mold half 18 via a spacer block (not shown), and is situated such that bottom surface 32d is flush against top surface 35 of mold half 18. This requires a channel to be machined between top surface 35 and cavity surface 36 for allowing excess material to reach gas purging block 22. Fasteners are inserted through the platen and the spacer block, and into bores 44. This allows gas purging block 22 to be used with molding or casting systems without pockets 28 and 30.

Figure 6:
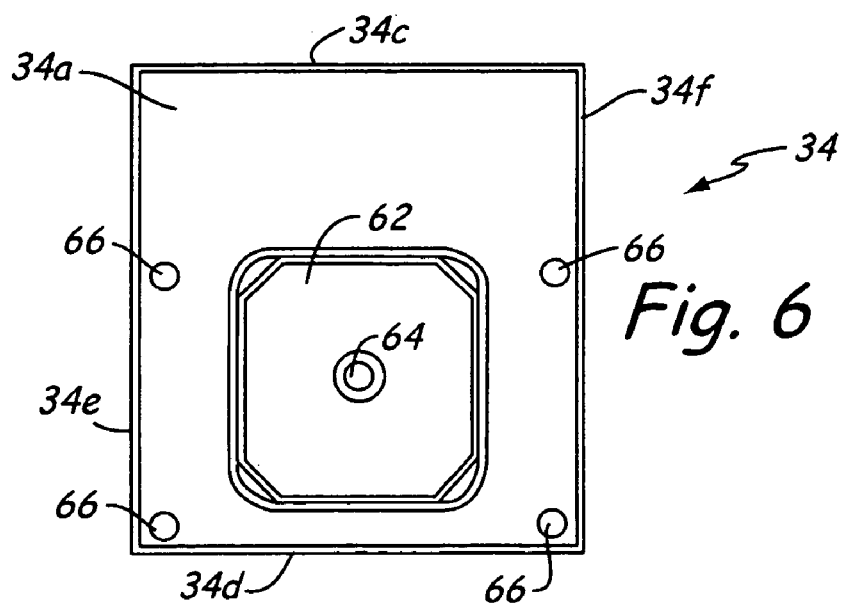
FIG. 6 is a front view of an ejector side block of the present invention.

FIG. 6 is a front view of ejector-side block 34 of FIGS. 3 and 4, elaborating on key 62 and bores 66. Key 62 is identical to key 42 of stationary-side block 32, and is used for aligning ejector-side block 34 within pocket 30 of mold half 20. Key 62 includes key bore 64, and is removably connected to ejector-side block 34 via a fastener inserted through key bore 64. When ejector-side block 34 is inserted into pocket 30 of mold half 20, key 62 inserts into key slot 40 of mold half 20, aligning bottom surface 34d flush with cavity surface 33. This allows a variety of block systems 18 to be quickly interchanged for use with various molding and casting processes without requiring excess alignment adjustments. Similar to stationary-side block 32, ejector-side block 34 may also be used without key 62, such as if mold half 20 did not incorporate key slot 40.

Bores 66 are identical to bores 44 of stationary-side block 32, and allow ejector-side block 34 to be directly mounted to mold half 20 at pocket 30 via mounting bores 41. Fasteners are inserted through outer surface 31 of mold half 20, through mounting bores 41, and into ejector-side block 34 at bores 66. Bores 66 correspondingly securely mounts ejector-side block 34 to mold half 20, and provides a convenient means for quickly disconnecting ejector-side block 34 from mold half 20.

Bores 66 also allow stationary-side block 32 to be installed externally to mold half 20, if required. Ejector-side block 34 may be connected to the platen (not shown) of mold half 20 via a spacer block (not shown), and is situated such that bottom surface 32d is flush against top surface 35 of mold half 20. This requires a channel to be machined between top surface 35 and cavity surface 36 of ejector-side block for allowing excess material to reach gas purging block 22. Fasteners are inserted through the platen and the spacer block, and into bores 66.

FIG. 7 is a top view of stationary-side block 32 of FIGS. 3–5, and further includes coupling fasteners 72. Coupling fasteners 72 removably connect vacuum line coupling 50 to top surface 24c of stationary-side block 32. Vacuum line coupling 50 is inserted into coupling slot 70 and secured with coupling fasteners 72. When coupling fasteners 72 are removed, vacuum line coupling 50 may be removed for allowing gas purging block 22 to function as a vent block. However, with vacuum line coupling 50 connected to stationary-side block 32, gas purging block 22 may be connected to a vacuum source for pulling a vacuum.

FIG. 7 also illustrates channels 46 extending through top surface 32c. As illustrated, the portions of channels 46 located at top surface 32c are counterbored. This allows fasteners to be inserted into channels 46 from top surface 32c and into cavity inserts located in cavity 24. Alternatively, coolant lines may be connected to channels 46 at to surface 32c to allow coolant fluids to flow through channels 46, for increasing the rate of cooling of the excess materials. The dual use of channels 46 is reciprocally exclusive. That is, when used as coolant channels, channels 46 may not be used as a means for mounting stationary-side block 32 to a cavity insert in mold half 18, and vice versa.

FIG. 8 is a top view of ejector-side block 34 of FIGS. 3, 4, and 6. It is observable that ribs 54 of ejector-side block 34 extend out beyond inner surface 34b. This allows ribs 54 to engage with ribs 68 of stationary-side block 32 when stationary-side block 32 and ejector-side block 34 close together.

Similar to channels 46 of stationary-side block 32, channels 58 extend through top surface 34c of ejector-side block 34 and are counterbored, allowing fasteners to be inserted, for mounting ejector-side block 34 to a cavity insert located in cavity 26 of mold half 20. Alternatively, coolant lines may be connected to channels 58 to allow coolant fluids to flow through coolant channels 58 for increasing the rate of cooling of the excess materials. However, as with channels 46, the dual use is reciprocally exclusive. When channels 58 are used as coolant channels, they may not be used as a means for mounting ejector-side block 34 to a cavity insert in mold half 20, and vice versa.

Figure 9:
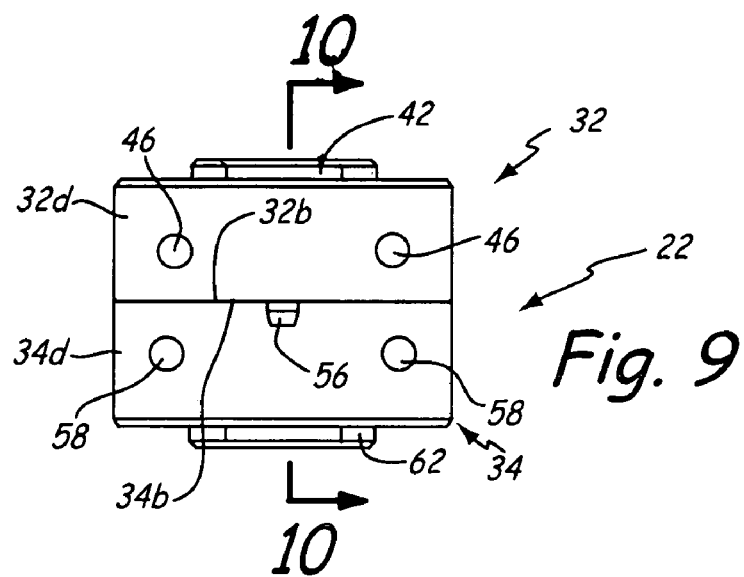
FIG. 9 is a bottom view of the present invention.

FIG. 9 is a bottom view of gas purging block 22 with stationary-side block 32 and ejector-side block 34 closed together. When mounted within pockets 28 and 30, stationary-side block 32 and ejector-side block 34 are in alignment so that they evenly close together, as illustrated in FIG. 9. Bottom surfaces 32d and 34d are flush with cavity surfaces 27 of mold halves 18 and 20, providing an even surface for the molding or casting. Channels 46 and 58 are exposed to cavities 24 and 26 for mounting stationary-side block 32 and ejector-side block 34 to cavity inserts. If not being used as mounting means, channels 46 and 58 may be sealed off with plugs (not shown) to prevent injected material from entering channels 46 and 58.

When stationary-side block 32 and ejector-side block 34 are closed together, inner surfaces 32b and 34b contact each other sealing off the portion around ribs 54 and 68. As such, when material is injected into the completed cavity, excess material enters gas purging block 22 at entry slot 56, and flows between ribs 54 and 68, as illustrated in FIGS. 10 and 10a.

Figure 10:
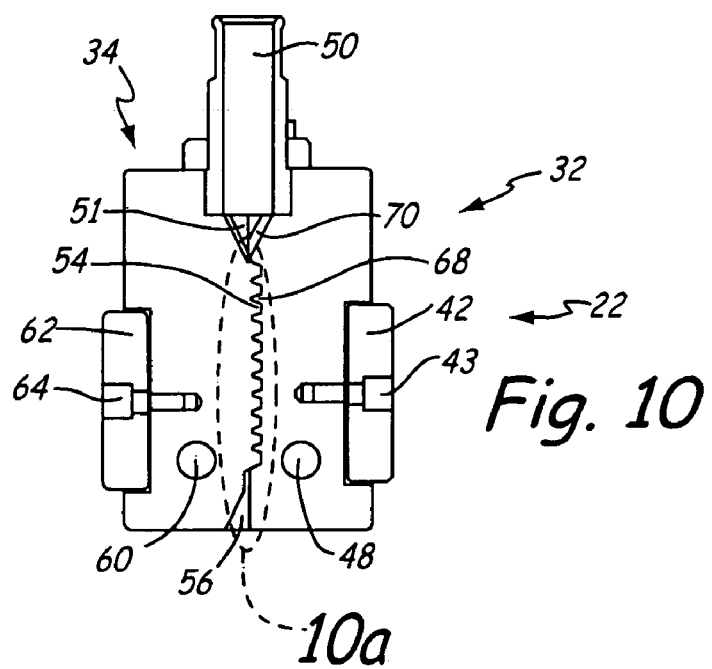
FIG. 10 is a sectional view taken along line 10—10 in FIG. 9.
Figure 10A:
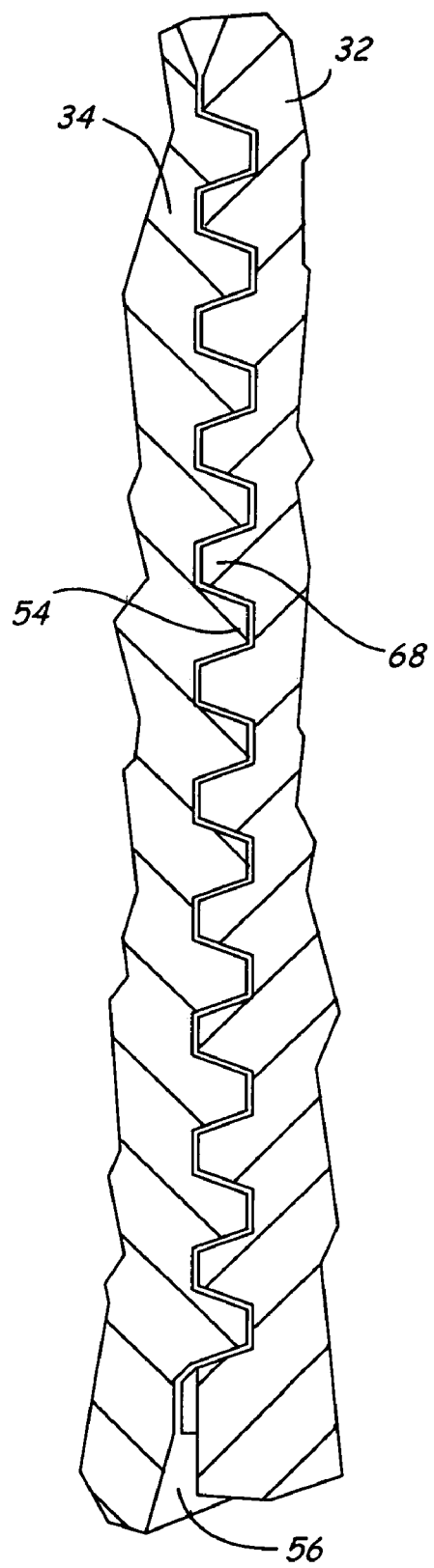
FIG. 10a is an enlarged view of section 10a in FIG. 10.

FIGS. 10 and 10a illustrate the engagement of stationary-side block 32 and ejector-side-block 34 when-closed. FIG. 10 is a sectional view of gas purging block 22 taken along line 10—10 in FIG. 9. FIG. 10a is an enlarged view of section 10a in FIG. 10, illustrating the engagement of ribs 54 and 68. As best illustrated in FIG. 10a, when engaged, ribs 54 and 68 leave a small gap between them for the excess material to flow through. As the excess material flows into entry slot 56, the saw-tooth flow path increases the surface area that the excess material must flow through. This correspondingly enhances the ability of gas purging block 22 to cool and solidify the excess material. As the excess material solidifies, it plugs up the small gap between ribs 54 and 68, preventing material from flowing any further. This prevents material from entering vacuum line coupling 50 and the vacuum system.

FIG. 10 also illustrates the connection between keys 40 and 62, and stationary-side block 32 and ejector-side block 34, respectively. Key bore 43 is a counterbored hole extending through key 42 and stationary-side block 32, for allowing a fastener to be inserted to connect key 42 and stationary-side block 32. Similarly, key bore 64 is a counterbored hole extending through key 62 and ejector-side block 34, for allowing a fastener to be inserted to connect key 62 and ejector-side block 34. This allows keys 40 and 62 to be removably connected to stationary-side block 32 and ejector-side block 34. If gas purging block 22 is used with mold halves 18 and 20 that do not have key slots 36, keys 40 and 62 may be easily removed.

FIG. 10 further illustrates cross channels 48 and 60. Cross channel 48 extends from right surface 32f of stationary-side block 32, and interconnects channels 46 for assisting in the flow patterns of the coolant fluids flowing through channels 46. Cross channel 60 extends from left surface 34e of ejector-side block 34, and interconnects channels 58 for assisting in the flow patterns of the coolant fluids flowing through channels 58.

Figure 11:
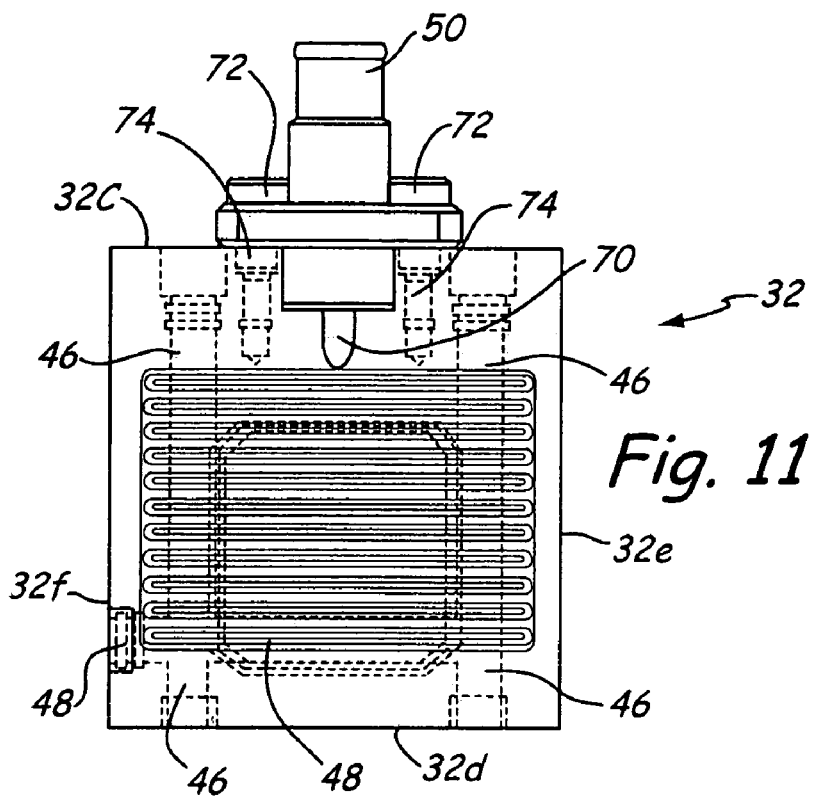
FIG. 11 is a rear view of the stationary-side block of the present invention.

FIG. 11 is a rear view of stationary-side block 32 illustrating inner surface 32b and components located within stationary-side block 32, illustrated by phantom lines. Vacuum line coupling 50 is connected to stationary-side block 32 via coupling fasteners 72 inserted into coupling bores 74. This secures vacuum line coupling 50 to stationary-side block 32, while also allowing vacuum line coupling 50 to be selectively removed to allow gas purging block 22 to function as a vent block.

FIG. 11 also illustrates the interconnections between channels 46 and cross channel 48. Channels 46 extend through stationary-side block 32 from top surface 32c to bottom surface 32d. At top surface 32c, channels 46 are counterbored for allowing fasteners to be inserted to secure stationary-side block 32 to a cavity insert located in cavity 24. If stationary-side block 32 is mounted as such, cross channel 48 is not used and may be sealed with a plug at right surface 32f. However, if stationary-side block 32 is not mounted via channels 46, channels 46 may be used as coolant channels. In such a case, cross channel 48 is used to direct the flow between channels 46. As such, channels 46 are sealed at bottom surface 32d via plugs to prevent injected materials from entering channels 46. Cross channel 48 may also be sealed by a plug. An input and output coolant line may then be connected to coolant channels 46 (one on each) at top surface 32c, allowing coolant to flow in one channel 46, through cross channel 48, and out through the other channel 46. This allows a cycle of coolant fluid to flow through stationary-side block 32 to enhance heat exchanging capabilities.

Figure 12:
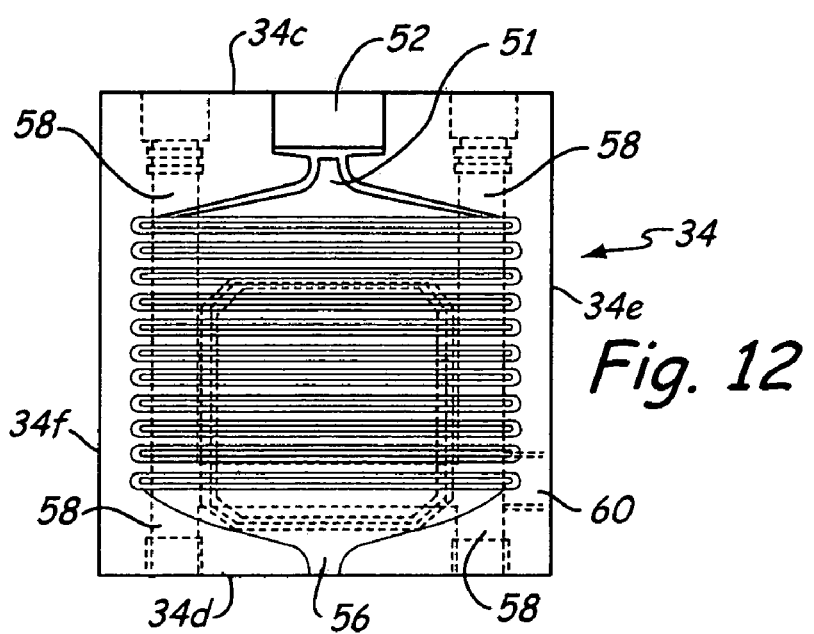
FIG. 12 is a rear view of the ejector-side block of the present invention.

FIG. 12 is a rear view of ejector-side block 34 illustrating inner surface 34b and components located within ejector-side block 34, illustrated by phantom lines. Channels 58 interconnect with cross channel in the same manner as channels 46 and cross channel 48 of stationary-side block 32. At top surface 34c, channels 58 are counterbored for allowing fasteners to be inserted to secure ejector-side block 34 to a cavity insert located in cavity 26. If ejector-side block 34 is mounted as such, cross channel 60 is not used and may be sealed with a plug at left surface 34e. However, channels 58 may alternatively be used as coolant channels, using cross channel 60 direct the flow between channels 58. Channels 58 are sealed at bottom surface 34d via plugs to prevent injected materials from entering channels 58. An input and output coolant line may then be connected to coolant channels 58 (one on each) at top surface 34c, allowing coolant to flow in one channel 58, through cross channel 60, and out through the other channel 58. This allows a cycle of coolant fluid to enhance the heat exchanging abilities of ejector-side block 34.

Channels 46 and 58 allow gas purging block 22 to be installed in a variety of molding and casting systems. For example, if coolant fluid is not required to solidify a given excess material, stationary-side block 32 and ejector-side block 34 may inserted into pockets 28 and 30, respectively, and directly mounted to mold halves 18 and 20 via mounting bores 41. If mold halves 18 and 20 do not incorporate mounting bores 41, stationary-side block 32 and ejector-side block 34 may be mounted to cavity inserts via channels 46 and 58. Additionally, if only a single cavity insert exists, such as one located in cavity 24 of mold half 18 only, stationary-side block 32 may be mounted to the cavity insert via channels 46, while ejector-side block 34 is mounted to mold half 20 via mounting bores 41. This illustrates the versatility of gas purging block 22.

Moreover, if a coolant fluid is required to solidify the excess material, either or both channels 46 and 58 may be connected to coolant lines, as required. In such a case, the blocks connected to the coolant lines may be mounted to the corresponding holder block via mounting bores 41. As such, gas purging block 22 is a universal valve-less block design for use with a variety of molding and casting systems. Although the present invention has been described with reference to preferred embodiments, workers-skilled in the art will recognize that changes may be made in form and detail without departing from the spirit and scope of the invention.

The invention claimed is:

1. A gas purging block for use with injection molding and die casting systems, the block comprising:
    a first-side block having:
        a first-side inner surface;
        a first-side upper surface and a first-side lower surface; and
        a pair of first-side channels extending through the first-side block parallel to the first-side inner surface,
    wherein the channels are proximal the first-side inner surface such that cooling fluid is circulatable in the channels to facilitate heat transfer from the first-side inner surface;
    wherein the channels extend from the upper surface to the lower surface such that fasteners can be extended through the channels such that the first-side block can be mounted in a first configuration;
    such that the channels are adapted to selectively function as conduits for cooling fluid and as mounting bores for mounting the first-side block to a first holder block, and
    a second-side block having a second-side inner surface adapted to engage with the first-side inner surface to define a gas passageway.

2. The gas purging block of claim 1, wherein the first-side block further comprises a first-side outer surface parallel to the first-side inner surface, wherein the first-side outer surface comprises a plurality of outer-surface mounting bores for mounting the first-side block to the first holder block in a second configuration.

3. The gas purging block of claim 1, wherein the first-side block further comprises:
    a first-side pair of side surfaces between the upper and lower surfaces; and
    a first-side cross-coolant channel interconnecting a first channel and a second channel of the pair of first-side channels; and
    wherein the cross-coolant channel extends from one of the first-side side surfaces.

4. The gas purging block of claim 3,
    wherein the first-side block further comprises a first-side outer surface parallel to the first-side inner surface, and
    wherein the first-side outer surface comprises a plurality of outer-surface mounting bores for mounting the first-side block to the first holder block in a second configuration.

5. The gas purging block of claim 1, wherein the first-side block further comprises an alignment key for aligning the first-side block when mounted to the first holder block.

6. The gas purging block of claim 1, wherein the second-side block further comprises:
    a pair of second-side channels extending through the second-side block parallel to the second-side inner surface,
    a second-side upper surface and a second-side lower surface;
    wherein the channels are proximal the second-side inner surface such that cooling fluid is circulatable in the channels to facilitate heat transfer from the second-side inner surface; and
    wherein the channels extend from the upper surface to the lower surface such that fasteners can be extended through the channels such that the second-side block can be mounted in a first configuration;
    such that the second-side channels are adapted to selectively function as conduits for cooling fluid and as mounting bores for mounting the second-side block to a second holder block.

7. The gas purging block of claim 6,
    wherein the first-side block further comprises a first-side outer surface parallel to the first-side inner surface,
    wherein the first-side outer surface comprises a plurality of outer-surface mounting bores for mounting the first-side block to the first holder block in a second configuration,
    wherein the second-side block further comprises a second-side outer surface parallel to the second-side inner surface, and
    wherein the second-side outer surface comprises a plurality of outer-surface mounting bores for mounting the second-side block to the second holder block in a second configuration.

8. The gas purging block of claim 6, wherein the first-side block further comprises:
    a first-side pair of side surfaces between the first-side upper and lower surfaces;

a first-side cross-coolant channel interconnecting the pair of first-side channels extending from one of the first-side side surfaces, and wherein the second-side block further comprises a second-side pair of side surfaces between the second-side upper and lower surfaces; and a second-side cross-coolant channel interconnecting the pair of second-side channels extending form one of the second-side side surfaces.

9. The gas purging block of claim 8, wherein the first-side block further comprises a first-side outer surface parallel to the first-side inner surface, wherein the first-side outer surface comprises a plurality of outer-surface mounting bores for mounting the first-side block to the first holder block in a second configuration, wherein the second-side block further comprises a second-side outer surface parallel to the second-side inner surface, and wherein the second-side outer surface comprises a plurality of outer-surface mounting bores for mounting the second-side block to the second holder block in a second configuration.

10. A gas purging block for use with injection molding and die casting systems comprising:

a stationary-side block comprising:
   a stationary-side heat exchanging surface adapted to cool excess injected material;
   stationary-side upper and lower surfaces;
   a first stationary-side channel extending through the stationary-side block; and
   a second stationary-side channel extending through the stationary-side block parallel to the first stationary-side channel;
   wherein the first and second stationary-side channels are proximal the stationary-side heat exchanging surface such that cooling fluid is circulatable in the first and second stationary-side channels to improve heat transfer;
   wherein the first and second stationary-side channels extend from the stationary-side upper surface to the stationary-side lower surface such that fasteners can be extended through the first and second stationary-side channels such that the stationary-side block can be mounted in a first configuration; and
   wherein the first stationary-side channel and the second stationary-side channel are adapted to selectively function as conduits for cooling fluid and as mounting bores for mounting the stationary-side block to a first holder block; and an ejector-side block adapted to engage with the stationary-side block, comprising:
   an ejector-side heat exchanging surface adapted to engage with the a stationary-side heat exchanging surface to define a gas passageway, and further adapted to cool the excess injected material;
   ejector-side upper and lower surfaces;
   a first ejector-side channel extending through the ejector-side block; and
   a second ejector-side channel extending through the ejector-side block parallel to the first ejector-side channel;
   wherein the first and second ejector-side channels are proximal the ejector-side heat exchanging surface such that cooling fluid is circulatable in the first and second ejector-side channels to improve heat transfer;
   wherein the first and second ejector-side channels extend from the ejector-side upper surface to the ejector-side lower surface such that fasteners can be extended through the ejector-side channels such that the ejector-side block can be mounted in a first configuration; and
   wherein the first ejector-side channel and the second ejector-side channel are adapted to selectively function as conduits for cooling fluid and as mounting bores for mounting the ejector-side block to a second holder block.

11. The gas purging block of claim 10, wherein the stationary-side block further comprises a plurality of outer-surface mounting bores generally perpendicular to the stationary-side heat exchanging surface for further mounting the stationary-side block to the first die block in a second configuration, and wherein the ejector-side block further comprises a plurality of outer-surface mounting bores generally perpendicular to the ejector-side heat exchanging surface for securing the ejector-side block to the second die block in a second configuration.

12. The gas purging block of claim 10, wherein the stationary-side block further comprises a stationary-side cross-coolant channel extending from a side surface of the stationary-side block and interconnecting the first stationary-side channel and the second stationary-side channel, and wherein the ejector-side block further comprises an ejector-side cross-coolant channel extending from a side surface of the ejector-side block and interconnecting the first ejector-side channel and the second ejector-side channel.

13. The gas purging block of claim 12, wherein the stationary-side block further comprises a plurality of outer-surface mounting bores generally perpendicular to the stationary-side heat exchanging surface for further mounting the stationary-side block to the first die block in a second configuration, and wherein the ejector-side block further comprises a plurality of outer-surface mounting bores generally perpendicular to the ejector-side heat exchanging surface for securing the ejector-side block to the second die block in a second configuration.

14. The gas purging block of claim 11, wherein the stationary-side block further comprises a stationary-side alignment key for aligning the stationary-side block when mounted to the first holder block, and wherein the ejector-side block further comprises an ejector-side alignment key for aligning the ejector-side block when mounted to the second holder block.

15. The gas purging block of claim 10, wherein the block system is adapted to alternatively function as a vacuum block and a vent block.

16. A gas purging block for use with injection molding and die casting systems, comprising a stationary-side block comprising:
   a stationary-side inner surface;
   a stationary-side outer surface parallel to the stationary-side inner surface;
   a pair of stationary-side coolant fluid channels extending completely through the stationary-side block adjacent the stationary-side inner surface such that cooling fluid is circulatable in the pair of channels to facilitate heat transfer from the stationary-side inner surface; and a first stationary-side mounting means for mounting the stationary-side block to a first holder block; and an ejector-side block comprising:

an ejector-side inner surface, adapted to engage with the stationary-side inner surface to define a gas passageway;

an ejector-side outer surface parallel to the ejector-side inner surface;

a pair of ejector-side coolant fluid channels extending completely through the ejector-side block adjacent the ejector-side inner surface such that cooling fluid is circulatable in the pair of channels to facilitate heat transfer from the ejector-side inner surface; and a first ejector-side mounting means for mounting the ejector-side block to a second holder block;

wherein the first stationary-side mounting means comprises fasteners adapted to be inserted through the pair of stationary-side coolant fluid channels, and wherein the first ejector-side mounting means comprises fasteners adapted to be inserted through the pair of ejector-side coolant fluid channels.

17. The gas purging block of claim 16, and further comprising:

a second stationary-side mounting means comprising a plurality of stationary-side bores into the stationary-side outer surface, and a second ejector-side mounting means comprising a plurality of ejector-side bores into the ejector-side outer surface.

18. The gas purging block of claim 17, wherein the second stationary-side mounting means comprises fasteners adapted to be inserted through the plurality of stationary-side bores, and wherein the ejector-side mounting means comprises fasteners adapted to be inserted through the plurality of ejector-side bores.

19. The gas purging block of claim 18, wherein the stationary-side block further comprises a stationary-side cross-coolant channel extending from a side surface of the stationary-block and interconnecting the pair of stationary-side coolant fluid channels, and wherein the ejector-side block further comprises an ejector-side cross-coolant channel extending from a side surface of the ejector-side block and interconnecting the pair of ejector-side coolant fluid channels.

* * * * *

UNITED STATES PATENT AND TRADEMARK OFFICE
CERTIFICATE OF CORRECTION

| | | |
|---|---|---|
| PATENT NO. | : 7,134,637 B2 | Page 1 of 1 |
| APPLICATION NO. | : 10/672090 | |
| DATED | : November 14, 2006 | |
| INVENTOR(S) | : Richard L. Dubay | |

It is certified that error appears in the above-identified patent and that said Letters Patent is hereby corrected as shown below:

Column 11, Line 8, delete "form", insert --from--

Column 11, Line 54, delete "with the a", insert --with the--

Signed and Sealed this

First Day of May, 2007

JON W. DUDAS
*Director of the United States Patent and Trademark Office*